US010689266B1

(12) United States Patent
Jennings

(10) Patent No.: US 10,689,266 B1
(45) Date of Patent: Jun. 23, 2020

(54) INTEGRATED DESALINATION-POWER SYSTEM

(71) Applicant: John Walter Jennings, Chandler, AZ (US)

(72) Inventor: John Walter Jennings, Chandler, AZ (US)

(*) Notice: Subject to any disclaimer, the term of this patent is extended or adjusted under 35 U.S.C. 154(b) by 0 days.

(21) Appl. No.: 16/478,895

(22) PCT Filed: Jan. 25, 2019

(86) PCT No.: PCT/US2019/015286
§ 371 (c)(1),
(2) Date: Jul. 18, 2019

(87) PCT Pub. No.: WO2019/148035
PCT Pub. Date: Aug. 1, 2019

Related U.S. Application Data

(60) Provisional application No. 62/497,313, filed on Jan. 26, 2018.

(51) Int. Cl.
*C02F 1/28* (2006.01)
*C02F 1/44* (2006.01)
*C02F 1/00* (2006.01)
*C02F 103/08* (2006.01)

(52) U.S. Cl.
CPC .......... *C02F 1/283* (2013.01); *C02F 1/004* (2013.01); *C02F 1/006* (2013.01); *C02F 1/008* (2013.01); *C02F 1/441* (2013.01); *C02F 2103/08* (2013.01); *C02F 2201/009* (2013.01); *C02F 2301/026* (2013.01)

(58) Field of Classification Search
None
See application file for complete search history.

(56) References Cited

U.S. PATENT DOCUMENTS

| | | | |
|---|---|---|---|
| 4,302,297 | A | 11/1981 | Huminston |
| 5,186,822 | A | 2/1993 | Tzong et al. |
| 6,083,382 | A | 7/2000 | Bird |
| 2008/0011689 | A1 | 1/2008 | Gordon |

(Continued)

FOREIGN PATENT DOCUMENTS

| | | |
|---|---|---|
| WO | 2010124697 A2 | 11/2010 |
| WO | 2011050473 A1 | 5/2011 |

*Primary Examiner* — Krishnan S Menon
(74) *Attorney, Agent, or Firm* — Invention To Patent Services; Alex Hobson

(57) ABSTRACT

An exemplary desalination-power system utilizes turbines configured within a water intake conduit to the desalination processor to produce power for the desalination processor. Water intakes are configured to provide a natural flow of water to the desalination processor though hydrostatic pressure. One or more turbines coupled with the water intake conduits are driven and produce power for the system. The desalination processor incorporates Graphene filters to and may include a structured water system to increase the H3O2 concentration of the water prior to Graphene filters. Discharge water may be pumped back into the body of water but be separated from the intakes. A secondary power source, such as a renewable power source, may be used to produce supplemental power for the system. Power produced may be provided to a secondary outlet, such as a power grid, ail above and/or underground.

22 Claims, 4 Drawing Sheets

(56) References Cited

U.S. PATENT DOCUMENTS

| | | |
|---|---|---|
| 2008/0023963 A1 | 1/2008 | Perich |
| 2010/0275599 A1 | 11/2010 | Glynn |
| 2011/0271505 A1 | 11/2011 | St. Germain et al. |
| 2012/0048813 A1 | 3/2012 | Irvin, Sr. et al. |
| 2015/0336807 A1 | 11/2015 | Alhazmy |
| 2016/0310899 A1 | 10/2016 | Bordain et al. |
| 2016/0312646 A1 | 10/2016 | Juano |
| 2017/0120253 A1 | 5/2017 | Sanford et al. |
| 2017/0122153 A1 | 5/2017 | Hampton et al. |
| 2018/0015428 A1* | 1/2018 | Nardella ................. B05B 17/08 |
| 2018/0179094 A1* | 6/2018 | McGhee ................. A61K 33/00 |
| 2018/0244538 A1* | 8/2018 | Tassen .................... C02F 1/005 |
| 2019/0225521 A1* | 7/2019 | Heath ....................... C02F 1/48 |
| 2019/0263686 A1* | 8/2019 | Karren ...................... C25B 9/08 |

* cited by examiner

US 10,689,266 B1

INTEGRATED DESALINATION-POWER SYSTEM

CROSS REFERENCE TO RELATED APPLICATIONS

This application is a national stage application of PCT application No. PCT/US2019/015286, filed on Jan. 25, 2019, which claims the benefit of priority to U.S. provisional patent application No. 62/497,313, filed on Jan. 26, 2018; the entirety of which is hereby incorporated by reference herein.

BACKGROUND OF THE INVENTION

Field of the Invention

The invention relates to an integrated desalination-power system that produces power and desalinated water.

Background

Clean water sources are becoming more and more scarce. Pollution and contamination from a wide range of sources have polluted many of the bodies of water, requiring filtration and chemical processing to produce clean potable water from these sources. Salt water body sources, due to their large volume, can be cleaner but require desalination for use. Desalination requires power to process the water and this power requirement makes desalination cost ineffective.

SUMMARY OF THE INVENTION

The invention is directed an integrated desalination-power system that combines a desalination system with a power production. In an exemplary embodiment, intake water is drawn from a body of water and through conduits that extend down into the body of water to produce a hydrostatic head that will force water into a desalination system. The intake conduit may extend down below the floor of the body of water. The hydrostatic head also forces the intake water through turbines that produce power for the system and may produce excess power that can be stored in batteries for later use, or may be provided to a power grid.

An exemplary integrated desalination-power system receives water from a salt or brackish water source, or body of water, such as an ocean, sea, lake, bay, river, or canal for example. The various bodies of water may have different floor terrain and may have a gradual drop in the floor or a more abrupt drop from the shore to a deep floor. The water intakes may be configured some distance from the shore of the body of water. The intake conduit may extend any suitable distance out into the body of water, such as about 10 m or more, about 50 m or more, about 100 m or more, about 500 m or more and any range between and including the values provided. An intake conduit comprises a conduit extension that extends out from a desalination system to the water intake. The water intake conduit is configured below the water source surface an intake depth. This intake depth may be higher in absolute elevation than the water intake to the desalination processor or system, thereby enabling gravity feed of water to the desalination system. The conduits may also extend above level of the intake and water may flow through as syphoned water to the desalination system. The hydrostatic head forces water from the body of water into the desalination processor. An intake conduit may extend down from the water intake to the floor of the body of water or below the floor of the body of water to an intake base, or the lowest portion of the water intake conduit. In an exemplary embodiment, a portion of the water intake conduit, such as conduit extension, extends from the intake base to the desalination system above and/or underground. In an alternative embodiment, a portion of the water intake conduit, such as the conduit extension, extends along the floor of the body of water between the intake base and the desalination system, and may extend along above ground to the desalination system. The hydrostatic pressure in the water intake conduit increases the deeper the water intake goes below the floor of the body of water. A discharge conduit from the desalination processor may extend back into the body of water to discharge salt water from the processor back into the body of water. The discharge outlet in the body of water may be separated from the intake conduit an offset distance to ensure the salinity of the water at the intake is not increased due to this discharge. This discharge offset distance may be about 10 m or more, about 50 m or, more, about 100 m or more and any range between and including the values provided.

Desalinated water is produced by either using brackish water having a salt content of 10,000 mg/L or less, or seawater having a salinity of about 30,000 to 44,000 mg/L. Desalinated water has a salinity of not more than about 500 mg/L and preferably no more than 200 mg/L.

In an exemplary embodiment, one or more turbines are coupled with the intake conduit to produce power from the flow of water into and through the intake and/or conduit extension from the intake to the desalination processor. The power produced from these turbines may be provided to the power system and a controller may determine if the power is stored in a battery, used to power the components of the system or provided to a secondary outlet, such as a power grid. An exemplary power system may comprise one or more secondary power sources including, but not limited to, wind power source or turbine, a solar power source such as a photovoltaic cell, a generator and the like. It may be preferable that the secondary power source is renewable and the proximity of the system to a body of water may make wind turbines a preferred choice, as sustained winds are common along the shore of large bodies of water. Power produced by the power system may be stored in a battery or battery pack for later use. For example, power produced by the turbines and by the secondary source may be stored in the battery and during the day or when the secondary source produces power and then drawn from at night, when the wind or photovoltaic cells are not producing much if any power. Also, power may be drawn from or delivered to a power grid, through power lines above and/or underground.

An exemplary power system may also produce power from a flow of water from a water tank. An exemplary water tank may hold about 5,000,000 gallons or more, about 10,000,000 gallons or more, about 25,000,000 gallons or more of water. The tank may be elevated above the ground to provide potential energy to push the water to a secondary location, such as a municipal water supply for general use, including drinking. Desalinated clean water may flow or be pumped into a tank from the desalination processor and a flow of water from this tank may drive turbines to produce additional power. In an exemplary embodiment, a tank is an elevated tank, such as a conventional water tower, and turbines are configured with the water tank outlet conduit to produce power when water is discharged from the tank. This water may flow to a reservoir, business, manufacturing or processing plant or to a residential area, such as for municipal water supply. Note that turbines may be configured in any of the tank conduits, or conduits extending from the water tank to a secondary location, such as along pipes to a municipal water supply system.

An exemplary battery for the storage of power may be any suitable type of battery including Iron and Water, lead acid, metal hydride, rechargeable nickel metal hydride, fuel cell, electrochemical flow battery comprising ion exchange membrane and the like.

An exemplary desalination system comprises a desalination processor comprising a plurality of filters to convert salt water to desalinated water, or water to have a salinity of less than about 500 mg/L. An exemplary desalination processor comprises a pre-filter to remove particles from the intake water, a structured water system that spirals the water to increase the H3O2 concentration, a Graphene filter comprising a plurality of layers of graphene, and a post filter which may be an absorbent filter such as an activated carbon filter, gravel, etc.

An exemplary pre-filter is a physical filter such as screen or netting material having an opening or series of openings through the thickness of multiple layers. The openings may be no more than about 25 mm, no more than about 10 mm, no more than about 5 mm, no more than about 2 mm, no more than about 1 mm and the any range between and including the opening sized provided.

An exemplary structure water system produces water with a higher concentration of H3O2 molecules than distilled water, such as about 10% higher or more, about 20% higher or more, about 50% higher or more and any range between and including the concentrations provided. A structured water system may cause the water to flow in a circle or spiral that this may be done by the Coriolis Effect or by a particular geometry of a structure water component. Structured water is a molecular arrangement of water molecules that exists when water is near hydrophilic (water loving) surfaces. Much like ice, water molecules join together in hexagonally structured single layer sheets. Unlike ice, however, the sheets are flexible and move independently as they are not glued together by protons. The majority of the water in your body is structured water as your bodily tissues are hydrophilic. Vortexing creates Structured Water. In a properly designed vortex, some water molecules dissociate into hydrogen and oxygen. This newly created oxygen and any oxygen already dissolved in the water is mixed uniformly. Oxygen itself is a hydrophilic element. Hexagonal sheets of structured water grow outward from the oxygen, layer by layer. Structured water involves arranging water molecules into groups, rather than disordered or random ordered H2O molecules. In fact, a healthy portion of the water actually changes its chemical formula to H3O2, as verified by Dr. Gerald Pollack of Washington State University. The condition is triggered by motion and vibrations, all the way down to the material present as the water flows.

An exemplary structured water system utilizes a vortexing device, (vortexer) that works on the premise of double vortexing and the piezo-crystal effect.

For biological use, healthier water is delivered via increased oxygen, increased wetting, reduced pathogens and results in greater crop growth and a significant increase in human and animal health. Structured water is a battery that needs constant charging. Energized structured water recharges the liquid battery of the body. When the body has sufficient energy, its aqueous interior is highly charged allowing for optimized cellular and metabolic function in addition to greater hydration and detoxification.

The totality of structured water does not just include the hexagonal sheets of water molecules mentioned earlier, but also the water immediately surrounding them. As the hexagonal layers grow, protons are ejected into the nearby water. This creates a most unexpected phenomenon—an electrical potential (voltage) between the structured water and the water surrounding it. In other words, structured water stores energy, much like a battery. Structured water grows (charges) by absorbing radiant energy. Both light waves and infrared waves, for example, charge structured.

An exemplary structured water system may be configured between the intake conduit and the desalination processor, in the discharge conduit or coupled with the discharge conduit to treat the discharge from the desalination processor and/or with the outlet of a reservoir, such as a water tank to treat the water prior to distribution, such as to a municipal water supply.

An exemplary graphene filter comprises a plurality of layers of graphene, such as about 2 or more, about 5 or more, about 10 or more, about 50 or more and any range between and including the number of layers provided. In addition, apertures may be formed through one or more of the Graphene layers to promote flow and these apertures may be very small, such as about 10 microns or less, about 5 microns or less, about 2 microns or less, sub-micron, such as less than 1 micron and even less than about 0.5 microns and any range between and including the aperture sizes provided.

In an exemplary embodiment, Graphene filters are utilized for the reverse osmosis process that is used in this saltwater desalination plant. This type of metal, Graphene, is an entirely new metal used to only allow the smallest water molecules to pass through the barrier in the reverse osmosis process for superior cleaning, of the water. The excess or discharge is then pushed back out into the ocean down current so as not to be sucked back in to the intake. The amount of power needed to push the salt water through the Graphene filter is only about 50% of what the standard reverse osmosis filters use.

Graphene is a two-dimensional mesh of carbon atoms arranged in the form of a honeycomb lattice. It has earned the title "miracle material" thanks to a startlingly large collection of incredible attributes. A Graphene layer is very thin, one atom thick and therefore requires a stack of about three million layers to make a 1 mm thick sheet. Graphene is light and strong and has very good heat and electrical conductivity. For filtration application, such as water filtration, Graphene is initially hydrophobic and repels water, but when the narrow pores are wet with water, by pressure or a pre-wetting surfactant, water permeates through the Graphene pores and layers and it is a very effective filter, removing salt in a desalination process. Stacks of Graphene sheets, having very pores therethrough, may be an effective water filter, because they are able to let water molecules pass but block the passage of contaminants and substances. Graphene's small weight and size can contribute to making a lightweight, energy-efficient and environmentally friendly generation of water filters and desalinators.

It has been discovered that thin membranes made from graphene oxide are impermeable to all gases and vapors, besides water, and further research revealed that an accurate mesh can be made to allow ultrafast separation of atomic species that are very similar in size—enabling super-efficient filtering. This opens the door to the possibility of using seawater as a drinking water resource, in a fast and relatively simple way.

An exemplary system may process a very large quantity of water, such as 100 gallons per minute (GPM), 500 GPM, 1,000 GPM, 5,000 GPM, 100,000,000 gallons per day (GPD) and any range between and including the water rates provided. The combined power produced by the turbines of the system may be as high as 10 MegaWatts or more, 100 MegaWatts or more, 200 MegaWatts or more, 500 MegaWatts or more and any range between and including the values provided.

In an exemplary embodiment, most of the components of the integrated desalination-power system are configured above and below ground. The water intake may be below the surface of the water and then extend above and/or below the floor of the body of water underground to an underground desalination system. Power produced by the turbines may be distributed by power lines that are also above and/or underground. A water tank may be configured above ground however when a water tank is employed.

This application incorporates by reference the entirety of Department of Energy Funding Opportunity Announcement (FOA) Number: DE-FOA-0001905 issued on Dec. 13, 2018: CFDA Number 81.086. In this document, four goals are provided:

Based on input to date, DOE has organized the Hub into four topic areas: 1) Materials Research and Development, 2) New Process Research and Development, 3) Modeling and Simulation Tools, and 4) Integrated Data and Analysis, summarized below:

Materials Research and Development (R&D):

Materials R&D has the potential to improve materials used in specific components and in water treatment systems so as to improve energy efficiency and lower costs. Desalination and related water treatment technologies can benefit from materials improvements for a range of products, including membranes, pipes, tanks and pumps that dramatically increase their performance, efficiency, longevity and are durable and corrosion resistant.

New Process Research and Development:

Novel technology processes and system design concepts are needed to improve energy efficiency and lower costs for water treatment, including new technologies related to water pre-treatment systems (e.g., upstream from the desalination unit operation). New process technologies are also needed to address associated challenges such as water reuse, water efficiency, and high-value co-products.

Modeling and Simulation Tools:

Multi-scale models and simulation tools are needed to inform the R&D via performance forecasting, design optimization, and operation of desalination technologies and related water-treatment systems that will lead to improved energy efficiency and lower cost.

Integrated Data and Analysis:

in order to consistently define, track, and achieve pipe parity in the highest impact areas, central, strategic, non-biased, integrated data and analysis is needed to align the Hub's project-level activities in each of the four topic areas to the Hub goals and to measure technical success of both project-level activities and the overall Hub. There is also a need to develop information resources, studies, and analysis tools necessary to guide the Hub's strategic R&D portfolio.

A control system may be used to control the functions of this integrated system such as opening and closing valves to allow water flow, monitoring and regulating power production and the like. A controller may be located in a remote location from the system and parameters of the system may be monitored remotely and/or on portable or mobile devices.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention and together with the description serve to explain the principles of the invention.

Figure 1:
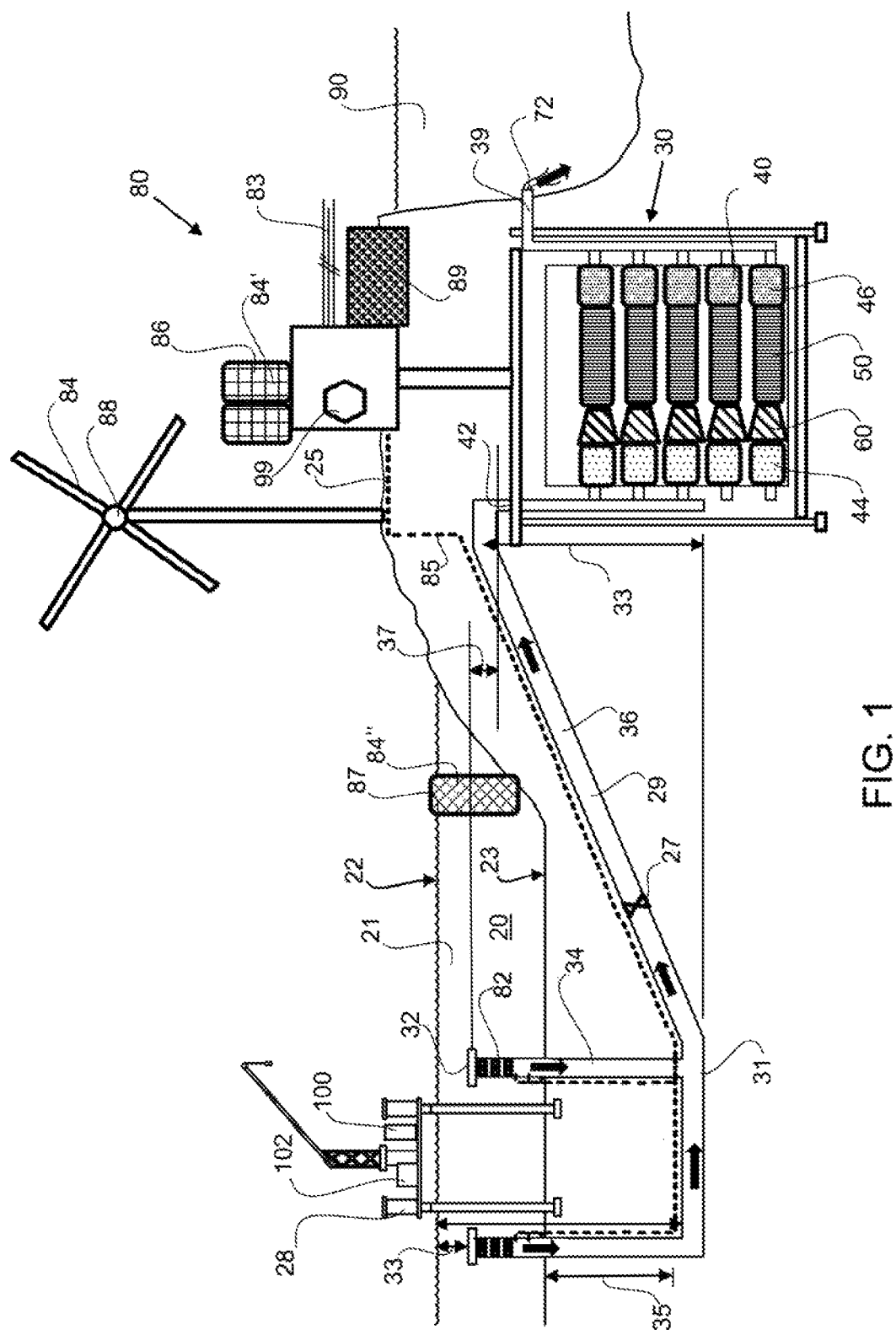
FIG. 1 shows an exemplary integrated desalination-power system having a desalination system that receives water from an intake conduit and a plurality of turbines in the intake conduit that produce power.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 4:
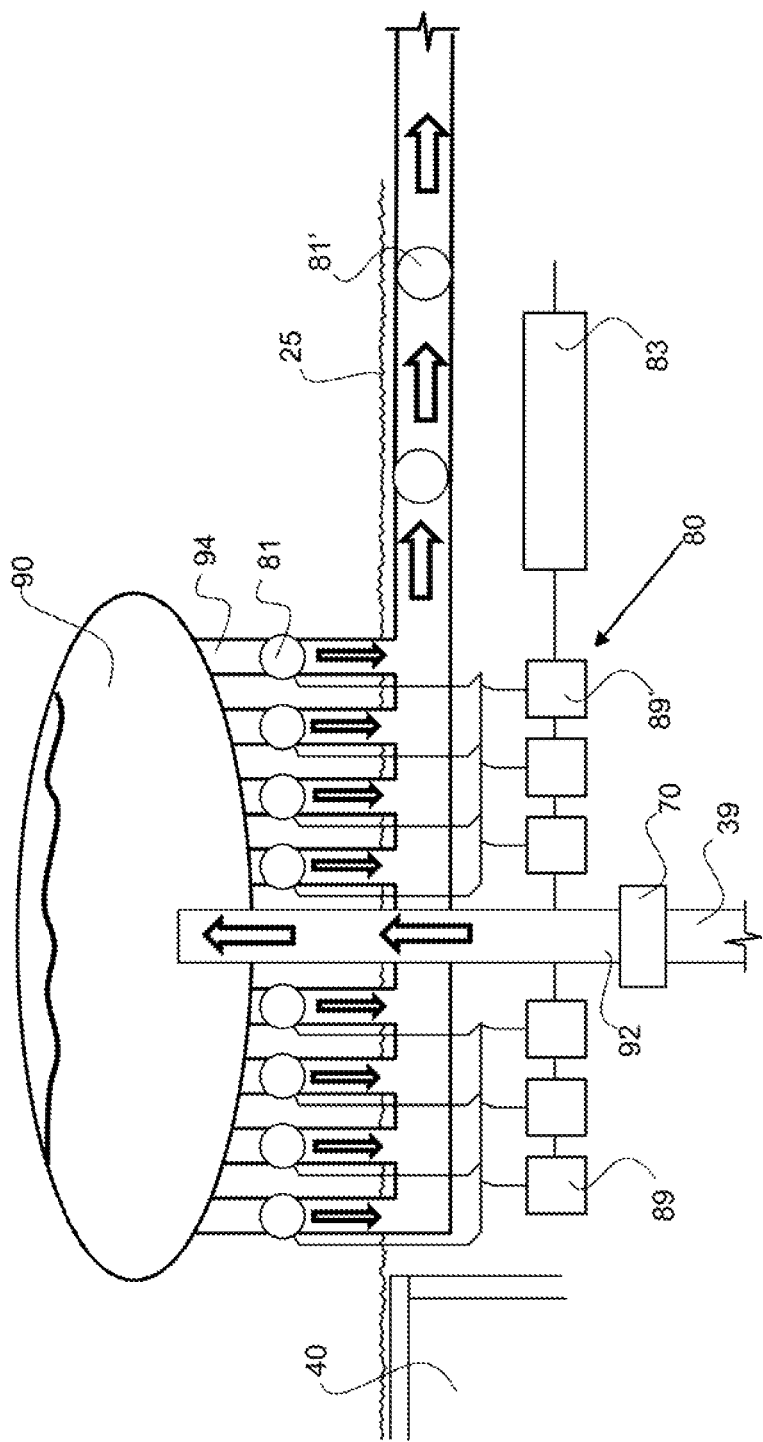
FIG. 4 show an enlarged view of the water tank and power system utilizing turbines configured along the water tank outlet conduit and off to the city water pipes, and in to the city water system, and at the pressure release valves.

Referring to FIGS. 1 and 4, an exemplary integrated desalination-power system 10 has a desalination system 30 that receives intake water 29 from an intake conduit 34 and a plurality of turbines 82 in the intake conduit 34 that produce power for the power system 80. The water intakes 32 are configured an intake depth 33 below the water source surface 22 of the body of water 21 which may be above the intake to the desalination system, a hydrostatic head distance 37. This hydrostatic head distance enables gravity feed of water to the desalination system. Again, the intake conduit may extend above the water intake level and the water may syphon to the desalination system. The water intakes may be supported or otherwise retained in position by a platform 28, or supports of the platform that extend down to the floor of the body of water. The platform or areas below the surface of the body of water may comprise components of the power system such as a generator and transmission 100 or power converter 102, for example. The platform may be hurricane proof and be constructed to withstand hurricane force winds and seas. The intake water flows through the water intakes 32, down into the intake conduit 34 which extends below the water source floor 23 and then through a conduit extension 36 to the inlet 42 of the desalination processor 40. The natural hydrostatic head forces water into the water intakes, through the turbine 82 to spin the turbine and produce power, which is transferred along power line 85 to the power system 80.

Figure 2:
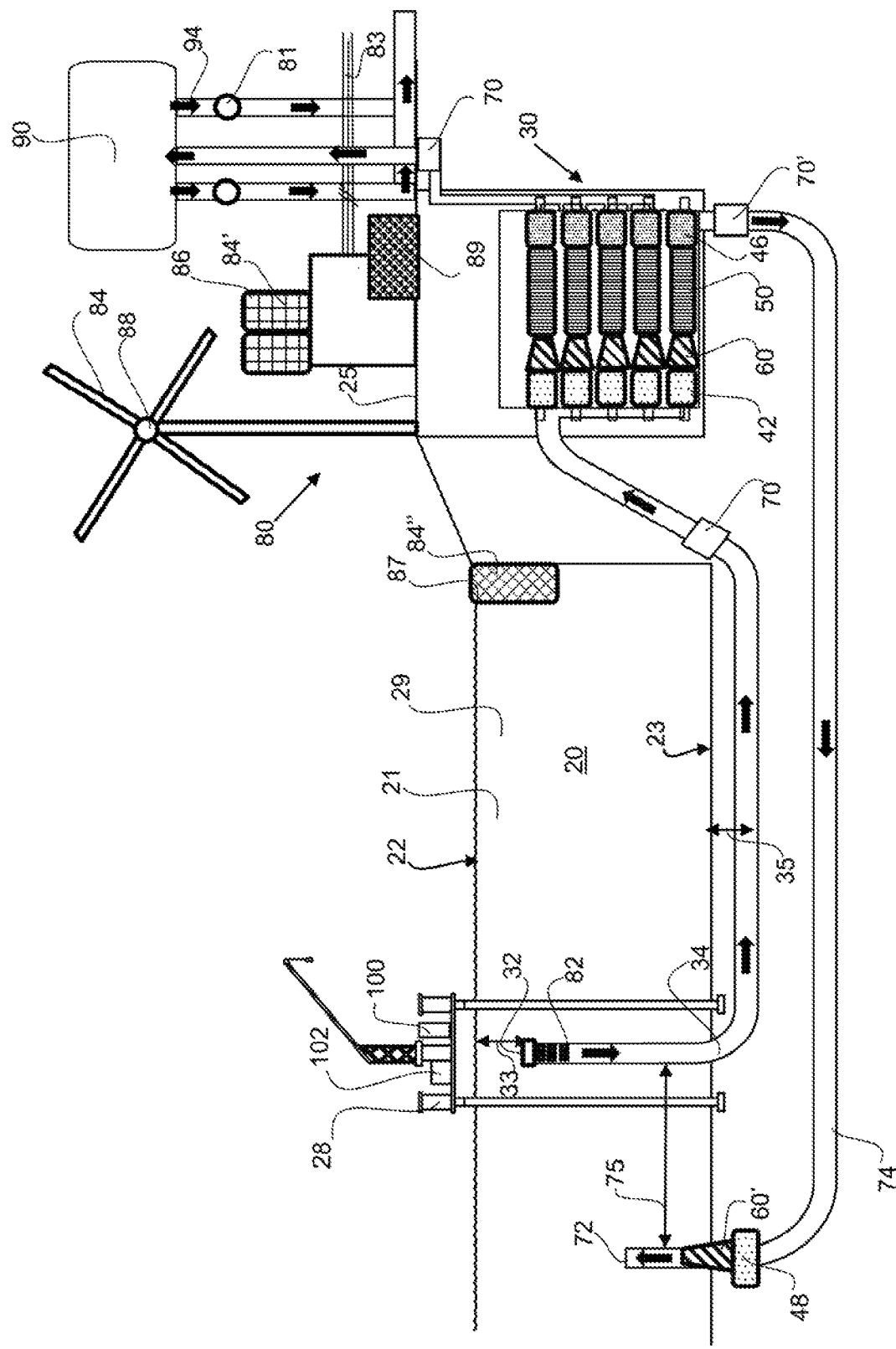
FIG. 2 shows an exemplary integrated desalination-power system having a desalination system that receives water from an intake conduit and a discharge conduit that extends back to a body of water to discharge the water from the desalination system after filtered and treated back into the body of water.

The exemplary desalination system comprises a prefilter 42, a structured water system 60, graphene filters 50 and a post filter 46 prior to discharge from the discharge outlet 72. The exemplary desalination processor 40 comprises a prefilter that may be utilized to take out any large debris and particles and may be a physical mesh or physical filter. An exemplary structured water system has a geometry to spiral the prefiltered water to change the composition of the water to have a higher concentration of $H3O2$ molecules. The water may vortex through the structured water system and then flow into the graphene filters. As described herein, the graphene filters may comprise a plurality of layers of individual layers of graphene. The filtered water then flows to a post filter, such as an absorbent filter before flowing as clean or desalinated water 39 out of the system, such as into a tank or reservoir. As shown in FIG. 1, the discharge water flows into a reservoir and as shown in FIG. 2, the discharge water 38 flows back to the water source body of water 21 through a discharge conduit 74. As shown in FIG. 1 the desalinated water 39 flows into a tank 90, such as a reservoir. As shown in FIG. 2, the desalinated water is pumped, by a pump 70 into an elevated tank 90.

The power system 80 comprises the turbines 82 in the intake conduit 34 and/or in the conduit extension 36 that are turned by the flow of intake water 29 through the conduit to produce power. The turbines generate power and comprise a generator or are coupled with a generator and transmission. The exemplary power system also comprises a secondary power source 84, which may be a renewable power source including a wind turbine 88, photovoltaic cell 86, tidal power system 87 and the like. An exemplary power system also comprises a battery 89 or battery pack storage building to store power for distribution as required, such as to the pumps, or to a power grid 83.

A control system 99 may be used to control the functions of the integrated desalination-power system 10 and may include a controller that receives input from sensor. A controller may open and close valves 27 to control the flow of water from the body of water to the desalination system and may monitor and control power production by the turbines. As described herein, the control system may be in a remote location and system parameters may be monitored remotely and/or on mobile devices.

As shown in FIG. 2, the desalinated water is pumped, by a pump 70 into an elevated tank 90, and turbines 81 are configured in the water tank outlets 94 to produce power for the power system 80. FIG. 2 shows an exemplary integrated desalination-power system having a desalination system that receives intake water 29 from an intake conduit 34 and a discharge conduit 74 that extends back to a body of water 21 to discharge the water from the desalination system back into the body of water. The discharge water 38 flows back to the water source body of water 21 through a discharge conduit 74. Note that the discharge outlet 72 is spaced apart from the water intake 32 by an offset distance 75. Also note that a filter 48 and/or structured water system 60 may be configured on the discharge conduit to treat the discharge to improve the body of water.

Figure 3:
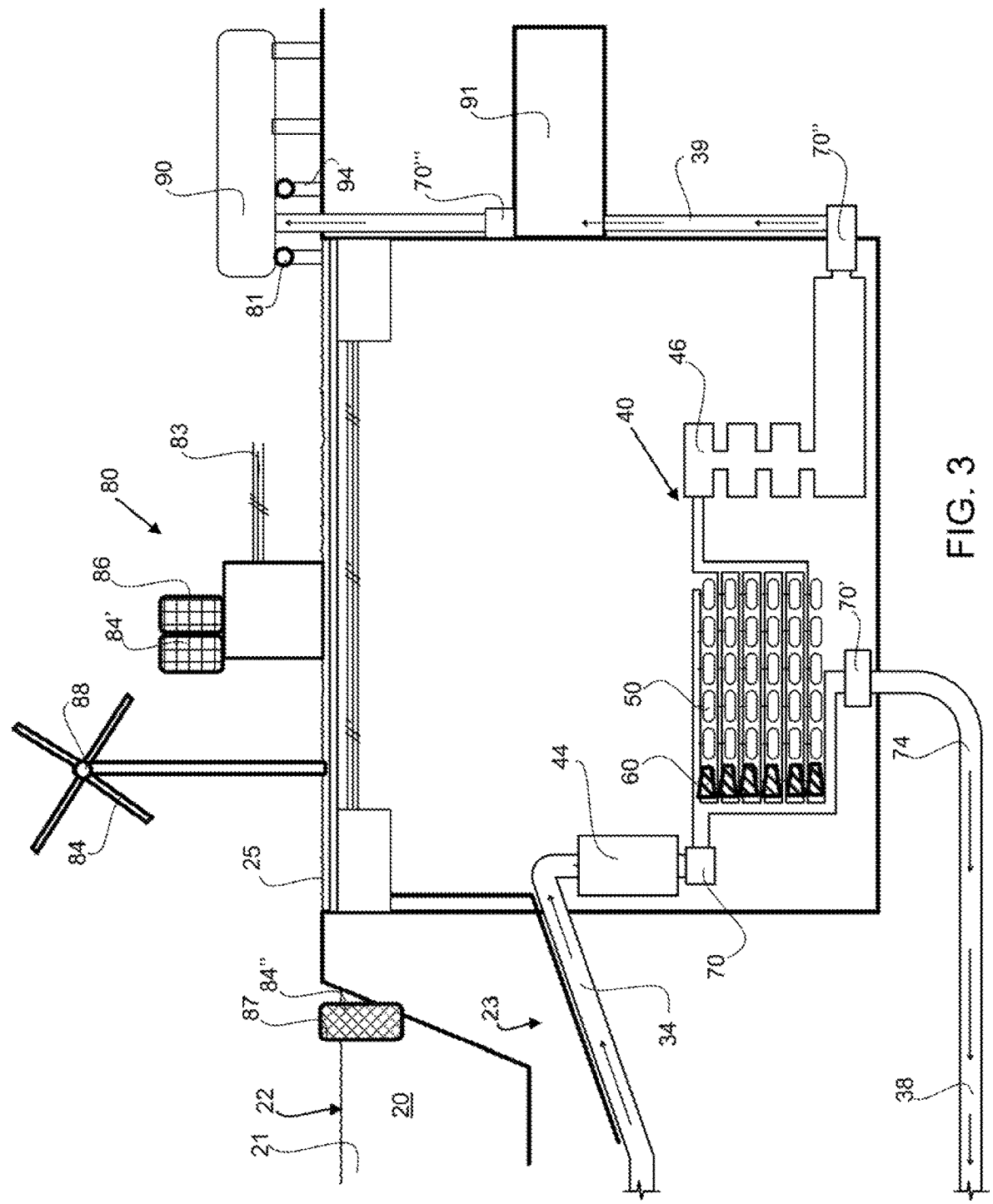
FIG. 3 shows an enlarged view of the desalination system and power system.

As shown in FIG. 3, the desalinated water 39 is pumped from the desalination processor 40 to a reservoir 91 and from the reservoir to an elevated tank 90. A plurality of turbines are configured on the water tank outlet conduits 94 and produce electrical power when water flows from the elevated tank through the outlet conduits. The system comprises a plurality of pumps 70 to 70" that may receive power from the power system.

As shown in FIG. 4, electrical power is produced by turbines 81 that are powered by the discharge of water from an elevated tank 90 through water tank outlet conduits 94. The power produced may be provided to the power system 80, such as to batteries 89, 89'. Turbines 81' may also be configured in a transfer conduit 96 coupled with the water tank outlet conduit, or along any of the conduits to along the supply lines. Power may be provided to the power grid or to the power system wherein the power, such as DC power is converted to power for distribution or for storage.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An integrated desalination-power system comprising:
   a) a desalination system comprising:
      i) a water intake configured an intake-depth below a water source surface to collect intake-water;
      ii) a desalination processor comprising:
         a graphene filter comprising a plurality of graphene layers; and
         a structured water system configured prior to the graphene filter;
      wherein the structured water system produces water with an elevated concentration of $H3O2$, wherein the elevated concentration is at least 20% higher than distilled water; and
      iii) an intake conduit extending from the water intake to an inlet of the desalination processor that is elevated above the water intake-depth a hydrostatic head height of at least 50 ft;
      wherein the desalination processor produces desalinated water from the intake-water;
   b) a power system configured to produce electrical power comprising:
      i) a turbine configured in the conduit;

wherein the turbine is turned by a flow of water through the inlet conduit to produce electrical power.

2. The integrated desalination-power system of claim 1, wherein the water source is an ocean, large lake or sea.

3. The integrated desalination-power system of claim 1, wherein the water intake-depth is at least 10 ft.

4. The integrated desalination-power system of claim 1, wherein the water intake-depth is at least 50 ft.

5. The integrated desalination-power system of claim 1, wherein the desalination processor comprises a pre-filter configured before the graphene filter.

6. The integrated desalination-power system of claim 1, wherein the desalination processor comprises a post filter after the graphene filter.

7. The integrated desalination-power system of claim 1, wherein the post filter comprises an absorbent material.

8. The integrated desalination-power system of claim 7, wherein the absorbent material comprises charcoal.

9. The integrated desalination-power system of claim 1, wherein the structured water system comprises a vortex portion.

10. The integrated desalination-power system of claim 1, wherein the graphene filter comprising at least 100 layers of graphene.

11. The integrated desalination-power system of claim 1, wherein the desalination system further comprises a discharge conduit having a discharge outlet.

12. The integrated desalination-power system of claim 11, wherein the discharge conduit extends into the water source.

13. The integrated desalination-power system of claim 12, wherein the discharge outlet is more than 100 ft from the water intake.

14. The integrated desalination-power system of claim 1, further comprising a platform secured to a water source floor, and wherein the water intake is coupled to the platform.

15. The integrated desalination-power system of claim 1, wherein the intake-conduit extends from the water source underground to the desalination processor.

16. The integrated desalination-power system of claim 1, wherein the power system comprises a secondary power source.

17. The integrated desalination-power system of claim 1, wherein the secondary power source is a renewable power source.

18. The integrated desalination-power system of claim 1, wherein the renewable power source comprises a photovoltaic cell.

19. The integrated desalination-power system of claim 1, wherein the renewable power source comprises at least one of a wind turbine, a photovoltaic cell and tidal power system.

20. The integrated desalination-power system of claim 1, wherein the renewable power source is selected from the group consisting of a wind turbine, a photovoltaic cell, and tidal power system.

21. The integrated desalination-power system of claim 1, wherein the power system further comprises a battery to store power generated by the turbine or other renewable energy.

22. The integrated desalination-power system of claim 1, further comprising a water tank for receiving the desalinated and wherein a turbine is configured in a water tank outlet conduit to produce power when water is discharged from said water tank through said water tank outlet conduit.

* * * * *